3,517,807
APPARATUS FOR SORTING FISH EGGS
Neil Van Gaalen, P.O. Box 578, Glenwood
Springs, Colo. 81601
Filed July 11, 1968, Ser. No. 744,230
Int. Cl. B07c 1/04, 5/342
U.S. Cl. 209—73        10 Claims

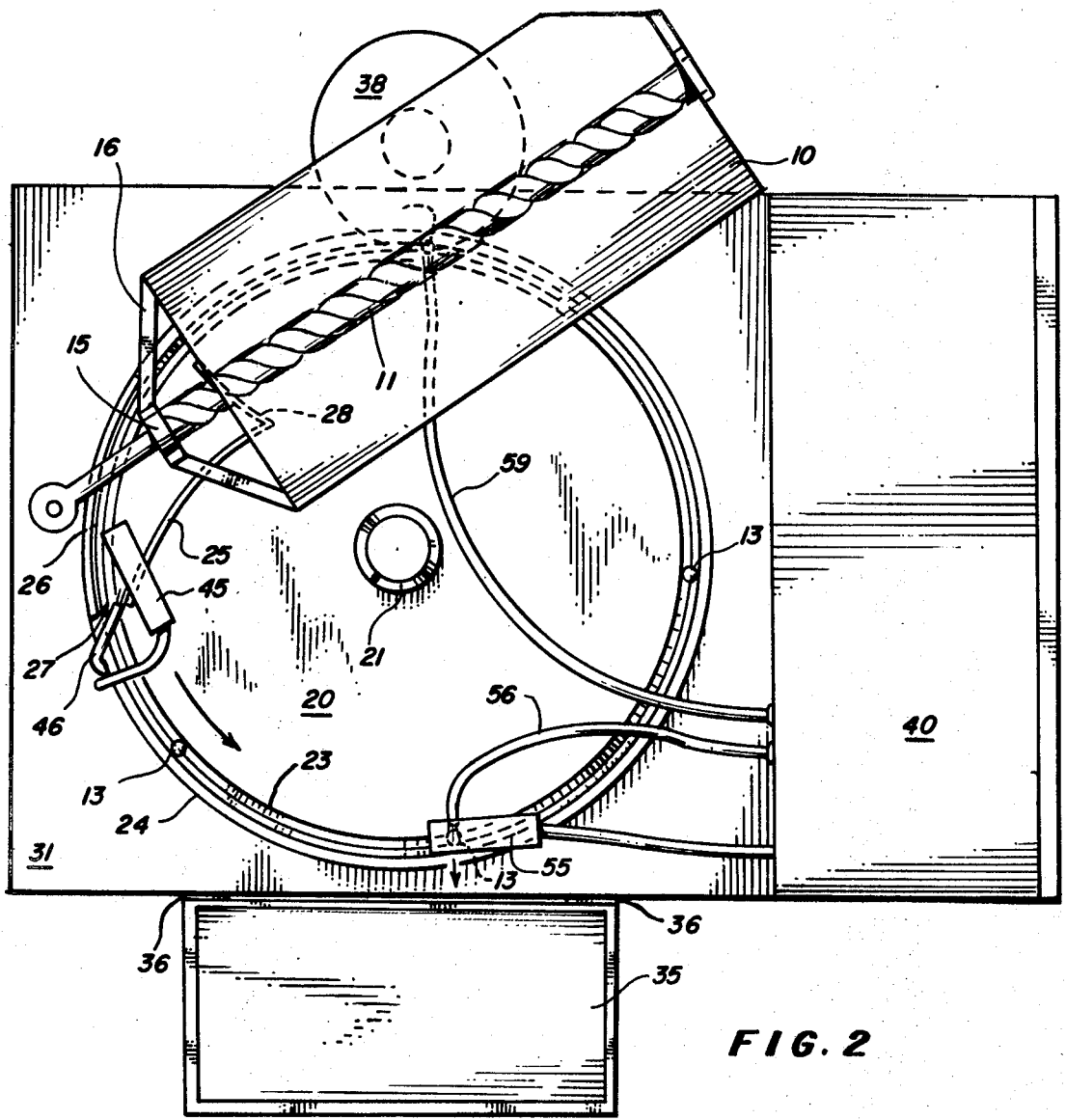
FIG. 2
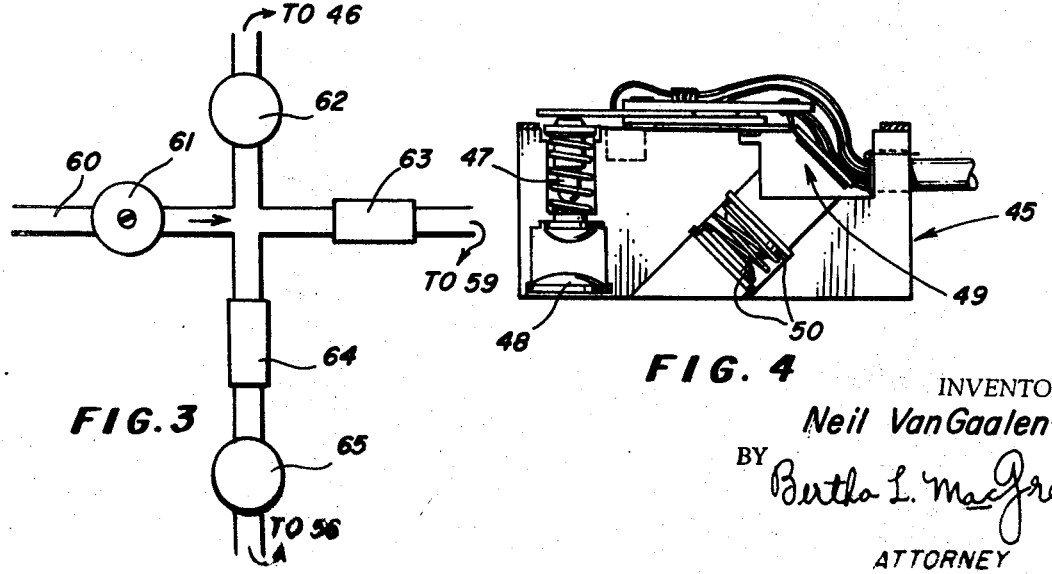
FIG. 3
FIG. 4
INVENTOR.
Neil Van Gaalen
BY Bertha L. MacGregor
ATTORNEY

United States Patent Office 3,517,807
Patented June 30, 1970

ABSTRACT OF THE DISCLOSURE

Apparatus for sorting fish eggs to separate dead eggs from live eggs without injury to the eggs, comprising an egg supporting turntable rotatable on a vertical axis, means for moving eggs in a single file from a supply tray to a non-compacting groove in the turntable, means for preventing jamming of the eggs, photo electric means for detecting dead eggs, means for blowing them off the turntable into a receiver, and blower means for moving the live eggs off the turntable into a receiver. The photo electric means comprises a light source and photo cell located above the egg supporting surface of the turntable to have their axes intersect adjacent said surface and avoid location of components at opposite sides of the egg supporting surface.

---

This invention relates to apparatus for sorting fish eggs to separate dead eggs from live eggs without injury to the eggs. This apparatus is designed to sort eyed trout and salmon eggs, but may be employed for sorting other eggs. When fish eggs reach the latter part of their incubation cycle, the fishes' eyes can be seen in the eggs and at this stage the eggs become fairly tough and are easily handled by the apparatus of my invention without injury to the eggs. Dead fish eggs become white in color and opaque to light whereas live eggs remain transparent except for the fishes' eyes. Dead eggs must be separated from the live ones to avoid fungus from dead eggs attaching to the live eggs and thereby killing the live eggs. Heretofore dead eggs have been removed by hand with the aid of a rubber syringe and glass tube.

The main object of this invention is to provide apparatus for the purpose stated which is dependable and capable of speedy sorting, as for example, 1200 eggs per minute.

Another object of the invention is to provide means for passing the eggs from a supply tray in single file to a horizontally disposed turntable rotatable about a vertical axis, and to provide means for preventing jamming of the eggs in their movement to the turntable.

Another object is to provide means for detecting dead eggs and means for blowing the dead eggs off the turntable into a receiver. The preferred detecting means shown and described is a photo electric sensing device which functions accurately and is located above the turntable in such relationship to the rotating table and eggs thereon that the axes of the light source and photo cell intersect above and adjacent to the egg supporting surface. This construction and arrangement of the photo electric components at one side of the turntable obviates the difficulties which are encountered when the components are located at opposite sides of the egg supporting surface through which the light beams would be required to pass.

Another object of the invention is to provide a turntable which supports the eggs to be scanned by the photo electrical devices without confining or compacting the eggs. The eggs are moved from a feeder tray to a groove in the turntable by an auger in the tray operated at selected speed. The groove in the turntable is proportioned to receive the eggs in non-confining and uncompacted condition.

Other objects and advantages will become apparent from the drawings and following description.

Figure 1:
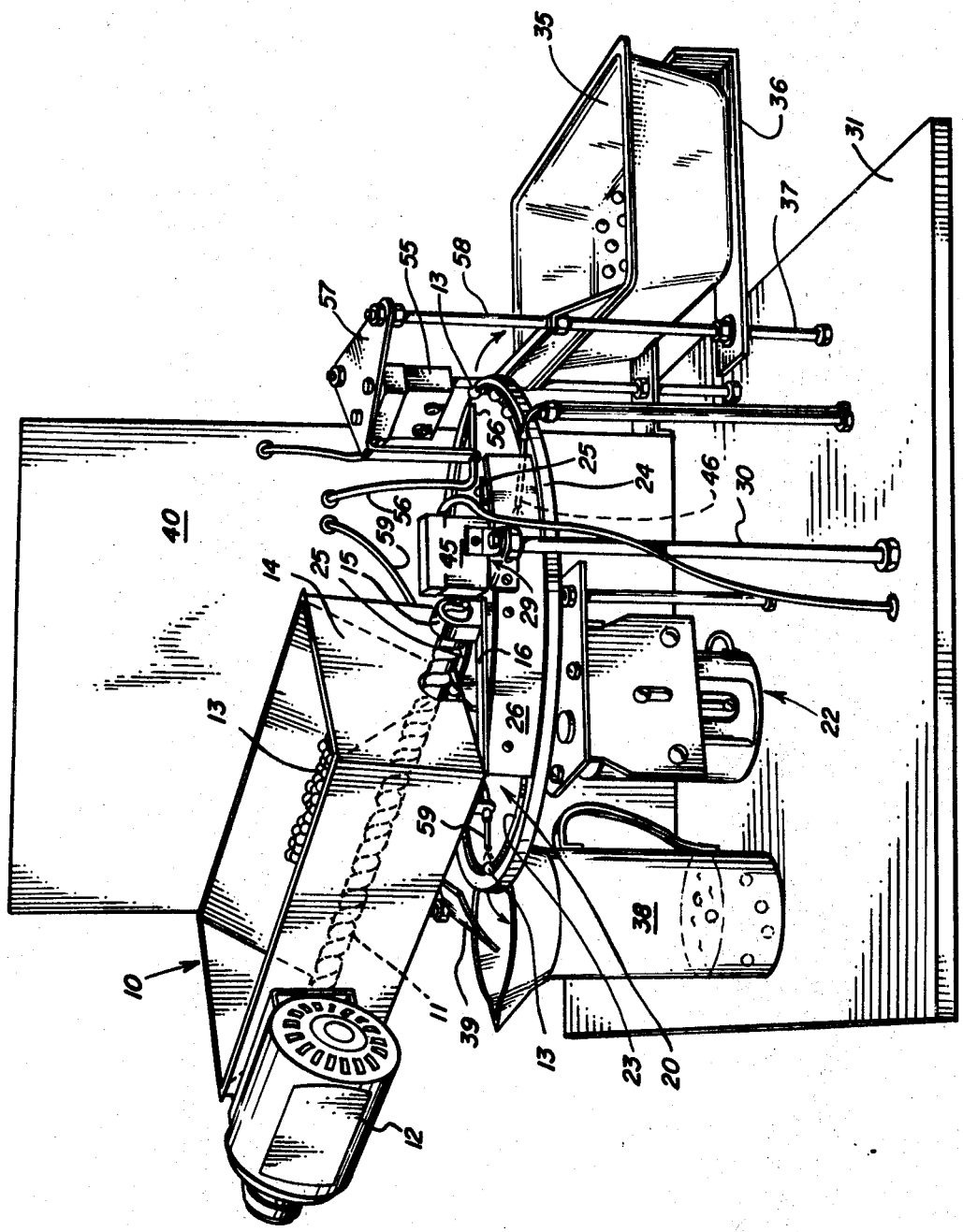
Figure 5:
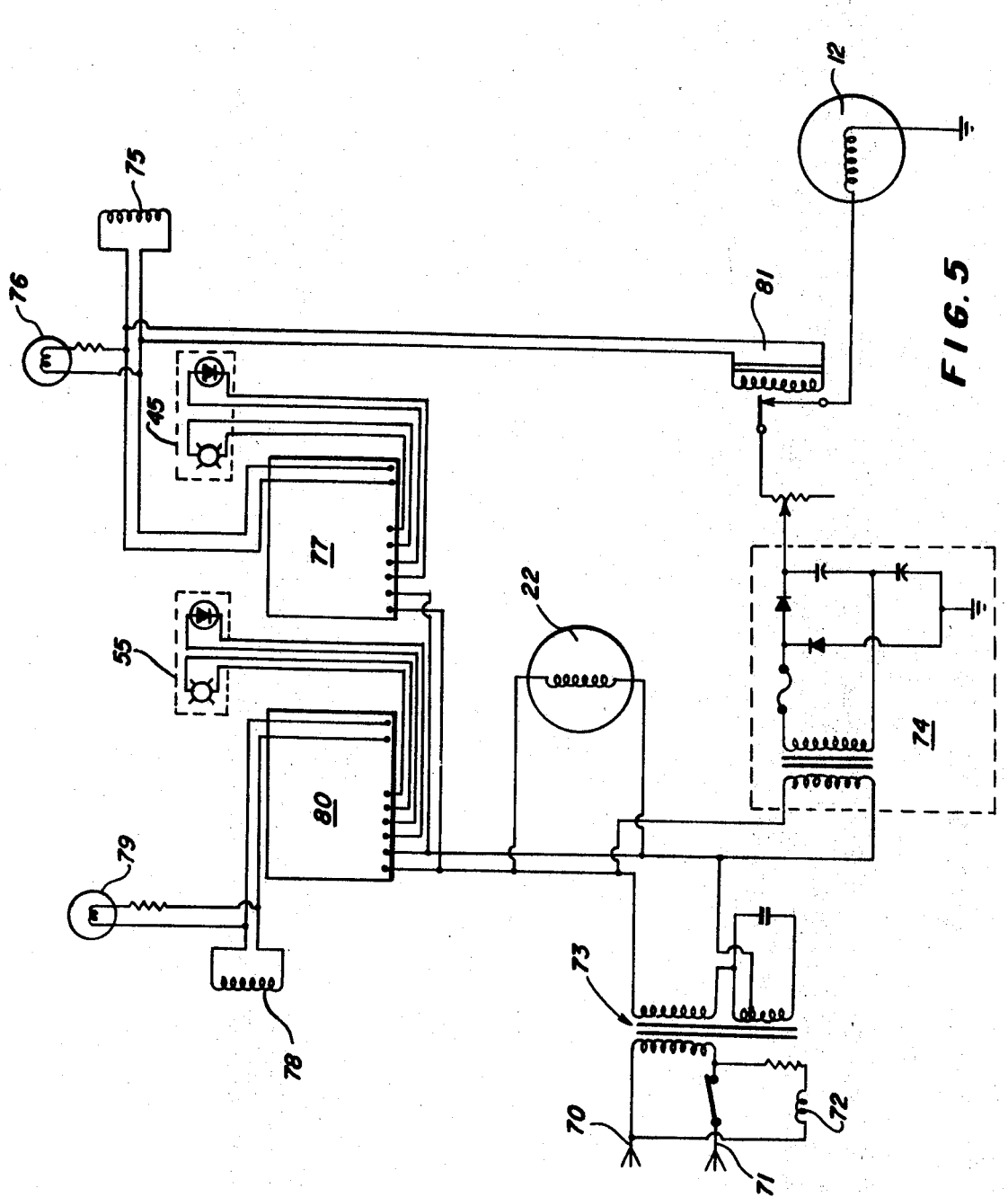

In the drawings:
FIG. 1 is a perspective view of fish egg sorting apparatus embodying my invention.
FIG. 2 is a top plan view of the apparatus shown in FIG. 1, with the auger motor omitted.
FIG. 3 is a diagrammatic view showing the air lines and control valves therefor.
FIG. 4 is an elevational view of a photo cell and light source suitable for use in my apparatus.
FIG. 5 shows a wiring diagram illustrating the electrical components and wiring used in this embodiment of the invention.

In that embodiment of the invention shown in the drawings, a feeder tray 10 is provided with a horizontally disposed auger 11 rotated by a variable speed motor 12 mounted on the tray 10 or any suitable support. The tray contains fish eggs 13. The auger is spaced from the tray walls sufficiently to avoid injuring the eggs. The inner surfaces of the tray sides are sloped to converge toward the auger near the bottom. The forward end of the auger 11 projects through an opening in the tray end 14 and is rotatably supported in the bearing 15 mounted on a supporting bracket 16 which may be mounted on any suitable support or be fastened to the feeder tray bottom. The tray 10 and auger 11 are located above a turntable 20 mounted to rotate about a vertical axis by the shaft 21 driven by the motor 22. The turntable 20 is provided with an annular groove 23 near its peripheral edge 24. Fish eggs are delivered by the auger to the turntable in a single row.

The eggs are guided to the turntable 20 by inner guide means 25 and outer guide means 26 which are shown in the form of vertical walls, the outer guide means 26 being curved on the axis of the turntable and located above a segment of the edge 24, and the inner guide means 25 being curved on the same radius as the means 26 but a different axis so that the two converge as shown in FIG. 2 to provide an exit 27 for eggs between the proximate edges of the guide means above the groove 23 in the turntable 20. The inner guide 25 has an inturned portion 28. The guide means 25 and 26 may be supported by any suitable means to be located above and slightly spaced from the turntable 20. The supporting means shown is a guide support indicated at 29 on leg 30 rising from the base 31 in FIG. 1.

A bad egg receiver 35 is positioned adjacent the turntable 20 on a shelf 36 supported by legs 37. Live eggs are discharged into good egg receiver 38 with the aid of a shield 39 fastened in this embodiment to the tray 10 or by other means so that it is located between the turntable edge 24 and receiver 38. A cabinet 40 contains the electrical control components and wiring shown in FIG. 5.

The turntable 20 is rotated in counter clockwise direction, carrying the eggs in single file from the tray 10. The auger 11 drops the eggs on the rotating table on which the eggs tend to roll over toward the outer wing 26, into a single row in the groove 23. The eggs are moist but not immersed in water. Occasionally eggs adhere to each other, and therefore I have provided mechanism for preventing jamming of eggs at the opening 27 between the guide means 25 and 26. This mechanism comprises a sensing device 45 and compressed air blower 46. The sensing device 45 (FIG. 4) may be a General Electric Company "Reflected Light Scanner" 3S750SR501 which comprises a lamp 47, lens 48, and cell assembly 49 with lenses 50. The device 45 is adjusted to sense both good and bad eggs, and is focused at a point slightly upwardly of the exit opening 27 between the guide members 25 and 26, so that if eggs pile up and prevent single file movement the photo cell detects the "jam" and activates an associated photo electric relay which will be identified hereinafter in the description of the components and circuits shown in FIG. 5. This relay in turn activates a relay which shuts off the motor 12 which drives the auger 11 in feeder tray 10, thereby stopping the flow of eggs from the tray. The photo electric relay also activates an air valve controlling the flow of air in the blower 46. The blower 46 sends a jet of air against the inner guide member 25 at a level high enough above the groove 23 in the turntable to allow eggs to pass beneath the air stream into the groove as the air jet strikes the jammed eggs which are blown back until the eggs have been carried off in single file by the turntable. When the sensing device 45 no longer senses jammed eggs, the photo electric relay again activates the motor 12 and shuts off the blower 46. The motor 12, being a variable speed motor, can be adjusted to provide a steady controlled flow of eggs to the area between the guide means 25 and 26.

Mechanism for separating bad eggs from good eggs in the groove 23 of the turntable comprises a sensing device 55 which may be similar to the one 45 heretofore described. This construction was chosen because the axes of the light source and photo cell are arranged at appoximately 45 degree angles and can be located above and relatively to the turntable to intersect exactly at the eggs in the groove 23. The sensing device 55 is adjusted to sense dead eggs and to activate a compressed air blower 56 which blows the dead eggs off the turntable into the receiver 35. If the turnable is rotated at 16 r.p.m., the blower 56 is located one quarter inch behind the sensing device spot light, in which location the blower acurately blows against the dead egg which activated the sensing device. The sensing device 55 may be mounted in carefully selected position as shown in FIG. 1 by any suitable means such as the support 57, on legs 58.

The good eggs remain on the turntable and are carried toward the receiver 38. They are blown by compressed air blower 59 into the good egg receiver.

The several compressed air blowers are controlled by adjustable valves. More air pressure is needed to operate the unjamming blower line 46 than the blowers 56 and 59, and therefore manual valves are provided as shown in the air line diagram of FIG. 3, where a compressor input air line is designated 60, air pressure regulator 61, electric air valve 62 in line to the unjamming blower 46; manual valve 63 in air line for good egg blower 59; and manual valve 64 and electric air valve 65 in line to dead egg blower 56.

In FIG. 5, I have shown electrical components and circuits suitable for controlling the operation of the fish egg sorting apparatus of my invention, but it is to be understood that various arrangements may be employed. The feeder mechanism motor 12 and the A.C. turntable motor 22 are heretofore described, as are also the "jam" sensing device 45 and dead egg sensing device 55. Electrical current lead lines are designated 70, 71, power indicator light 72, Sola transformer 73, D.C. power supply 74, air valve coil 75 for controlling valve 62 to unjamming blower 46, indicator light 76, photo electric relay 77 in circuit with sensing device 45 for activating unjamming blower 46, air valve coil 78 for controlling valve 65 to dead egg blower 56, indicator light 79, photo electric relay 80 in circuit with sensing device 55 for detecting dead eggs, and relay 81 in line between motor 12 and feeder sensing device circuits. The relay 81 is closed when not energized.

The operation of the apparatus will be understood from the foregoing description. Summarizing, the auger 11 drops eggs 13 to the turntable 20 turning in counter clockwise direction; the eggs roll toward the outer guide 26 in single file, passing through exit 27 into groove 23 of the table; when the eggs reach the scanner 55 the dead eggs are detected and instantly blown off the table by blower 56 while good eggs are carried to the blower 59 for deposit in good egg container 38. The reflective sensing device 55 for detecting dead eggs is adjusted so that it will not be activated by good eggs but when a dead egg comes under the light, the white egg causes a reflection which activates the sensing device. This activates the associated photo electric relay 80 which in turn activates the blower 56. The relative positions of the sensor 55 and blower 56 are determined by the speed of rotation of the turntable 20. As stated, if the speed is 16 r.p.m., the sensing device intersecting beams are fixed at one quarter inch forwardly of the blower 56.

In the event any jamming occurs near the exit 27, the scanner 45 detects the jam and activates the associated photoelectric relay 77 which in turn activates the relay which controls motor 12, thus turning off the motor to the auger and causing the air blower 46 to direct an air jet against the inner wing 25, causing jammed eggs to back up and allow eggs to move in single file into the groove 23. When the jammed eggs have been separated from each other and carried off by the turntable 20, the sensing device 45 shuts off the air jet 46 and re-energizes motor 12, to continue normal operation.

Changes may be made in details of construction and form and arrangement of parts without departing from the scope of the invention as defined by the appended claims.

I claim:

1. Apparatus for sorting fish eggs to separate dead from live eggs, comprising
   (a) a turntable rotated about a vertical axis,
   (b) a feeder tray containing eggs,
   (c) means for delivering eggs in single file from the tray to the turntable,
   (d) means positioned above the turntable for sensing eggs jammed out of single file formation,
   (e) means adjacent the sensing means for unjamming the jammed eggs,
   (f) means focused on the eggs on the turntable for sensing dead eggs,
   (g) means activated by the dead egg sensing means for removing dead eggs from the turntable, and
   (h) means for removing live eggs from the turntable.

2. The apparatus defined by claim 1 in which the turntable is provided on its upper surface with an annular groove located adjacent its peripheral edge, said groove being wide enough to receive eggs in uncompacted single file arrangement.

3. The apparatus defined by claim 2 in which the means for sensing dead eggs is a photo electrical device located above the groove in the turntable, said device producing intersecting light beams focused on the eggs in the groove, and the means for removing dead eggs is a compressed air blower located above the turntable groove slightly behind the intersecting beams of the photo electrical device in the path of rotation of the turntable, said blower being activated by the photo electrical device when it detects a dead egg.

4. The apparatus defined by claim 1 which includes a motor driven auger located in the feeder tray, said tray having an opening through which the auger delivers eggs to the turntable.

5. The apparatus defined by claim 4, in which the means for delivering eggs in single file to the turntable comprises a pair of guide members spaced apart and converging to a restricted opening and spaced slightly from the top of the turntable to allow eggs to pass into the turntable groove in single file.

6. The apparatus defined by claim 5 in which the means for sensing jammed eggs is a photo electrical device located above the turntable adjacent the opening between the guide members, and the unjamming means is a compressed air blower activated by the photo electrical device for blowing against a guide member and causing jammed eggs to move back from the opening.

7. The apparatus defined by claim 6 which includes an auger mounted in the tray for rotation about its longitudinal axis, and a motor rotating the auger, and in which the means for sensing jammed eggs automatically stops rotation of the auger until unjamming has been completed.

8. The apparatus defined by claim 1 which includes an auger mounted in the tray for rotation about its longitudinal axis, and a motor rotating the auger, and in which the means for sensing jammed eggs automatically stops rotation of the auger until unjamming has been completed.

9. Apparatus for sorting fish eggs to separate dead from live eggs, comprising
   (a) a turntable rotated about a vertical axis,
   (b) a feeder tray having sloped converging internal side walls for containing eggs,
   (c) a motor driven auger in the tray spaced from the internal walls,
   (d) an opening in the tray through which the auger extends for conveying eggs to the turntable,
   (e) guide means positioned slightly above the turntable for guiding eggs in single file to the turntable,
   (f) means positioned adjacent the guide means for sensing eggs jammed out of single file formation,
   (g) means adjacent the jammed egg sensing means for unjamming the jammed eggs,
   (h) means focused on the eggs on the turntable for sensing dead eggs,
   (i) means activated by the dead egg sensing means for removing dead eggs from the turntable, and
   (j) means for removing live eggs from the turntable and depositing them in a live egg container.

10. The apparatus defined by claim 9, in which the turntable is provided with an annular groove located near the peripheral edge of the turntable and beneath the guide means for receiving eggs from the tray, said groove being of a width sufficient to receive eggs in unconfined uncompacted condition.

References Cited

UNITED STATES PATENTS

| | | | |
|---|---|---|---|
| 3,297,157 | 1/1967 | Jensen | 209—111.7 X |
| 3,410,403 | 11/1968 | Adcox | 209—111.7 X |

RICHARD A. SCHACHER, Primary Examiner

U.S. Cl. X.R.

209—111.7; 250—223; 356—209